United States Patent [19]

Mendelson

[11] 3,955,457
[45] May 11, 1976

[54] TABLE MOUNTING FOR POWER TOOL

[76] Inventor: Kenneth Mendelson, 1317 E. 8th St., Brooklyn, N.Y. 11230

[22] Filed: Mar. 25, 1974

[21] Appl. No.: 454,075

[52] U.S. Cl. .................................. 83/477.2; 83/859
[51] Int. Cl.² ............................................ B27B 5/30
[58] Field of Search ............... 83/477, 477.1, 477.2, 83/859; 248/13; 144/1 R, 1 G, 1 H

[56] References Cited
UNITED STATES PATENTS

| | | | |
|---|---|---|---|
| 1,873,700 | 8/1932 | Dempster | 83/477.2 |
| 3,285,303 | 11/1966 | Kwiatkowski | 83/477.1 |
| 3,734,151 | 5/1973 | Skripsky | 144/1 R |

*Primary Examiner*—J. M. Meister
*Assistant Examiner*—Fred A. Silverberg
*Attorney, Agent, or Firm*—Marvin Feldman

[57] ABSTRACT

A table mounting for a power tool wherein a pair of opposed rods frictionally engage the top of the power tool base and the rods are held in place under stress by mountings connected to the underside of a table, so that the bottom of the base is held against the underside of the table and the powered work member of the power tool is held in an upwardly disposed position between an opening in the top of the table. This mounting is useful in mounting a power tool such as a power rotary saw, to a partible household table, for performing work thereon.

13 Claims, 7 Drawing Figures

TABLE MOUNTING FOR POWER TOOL

This invention relates to mounting a power tool to a table. More specifically this invention relates to mounting a rotary power tool to a household partible table so as to convert to a work bench unit.

Heretofore specifically designed work bench units were manufactured for the home craftsman, which units occupied considerable space and often at a considerable cost. Now there is provided by the present invention, the mounting of a portable rotary power tool to a conventional household table, such as a partible dinette table, to convert same to an inexpensive work bench unit, which table may be readily reconverted to its former intended use.

One object of this invention is to provide a table mounting for a portable power tool.

Another object of this invention is to provide for mounting the base of a portable power tool to the underside of a table having an opening in the top thereof, so as to convert to a work bench unit.

A further object of this invention is to provide mounting brackets which may be readily connected to the underside of a table and which may be readily assembled and disassembled with the base of a power tool.

Still a further object of this invention is to provide mounting brackets as immediately aforesaid which may alternatively accomodate several different power tools.

Still a further object of this invention is to provide bracket mountings as aforesaid which may be connected to the underside of a table without impairing the appearance of the table in normal viewing of the table.

Still a further object of this invention is to provide mounting brackets for mounting a power tool to a household table such as a conventional partible dining table.

Still a further object of this invention provides for the rotational assembly of the mounting brackets as aforesaid with rods for holding the bottom of the base of the power tool under stress against the underside of the table top.

It is still a further object of this invention to provide table mounting brackets which are readily inexpensive to manufacture, readily assembled nd disassembled with a power tool to a table, and practical and efficient in design and operation and yet safe in use.

The aforesaid as well as other objects and advantages as will be made clear from a reading of the following specification and adjoined claims and the accompanying drawings in which:

Figure 1:
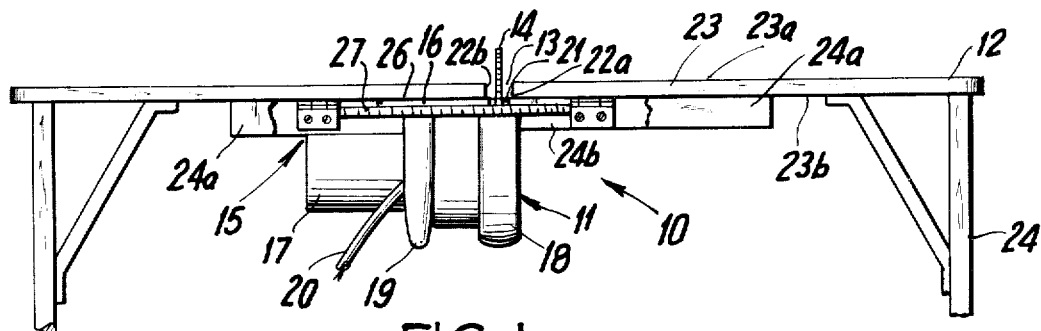
FIG. 1 is a side elevational view of one embodiment of the invention.
Figure 2:
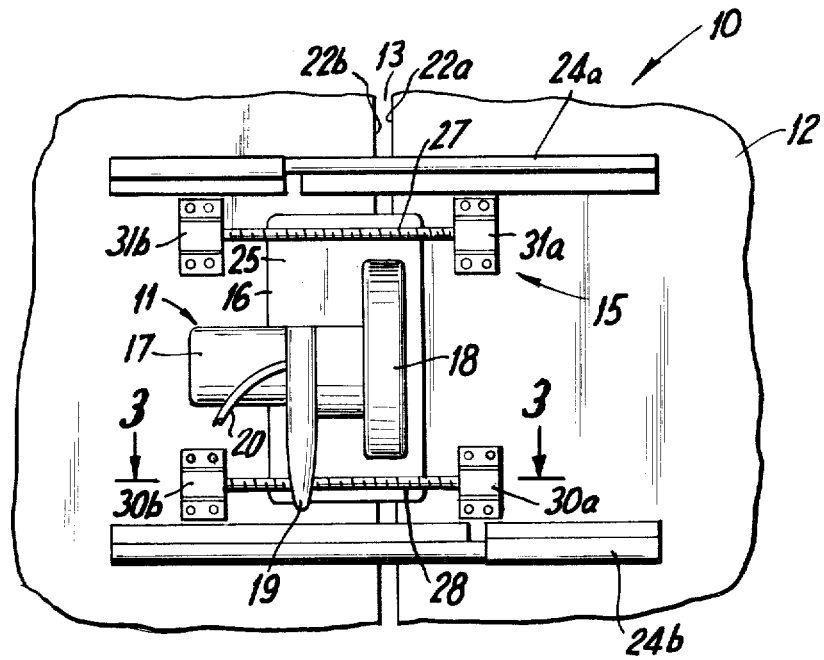
FIG. 2 is an enlarged bottom plan view of the embodiment shown in FIG. 1.
Figure 3:
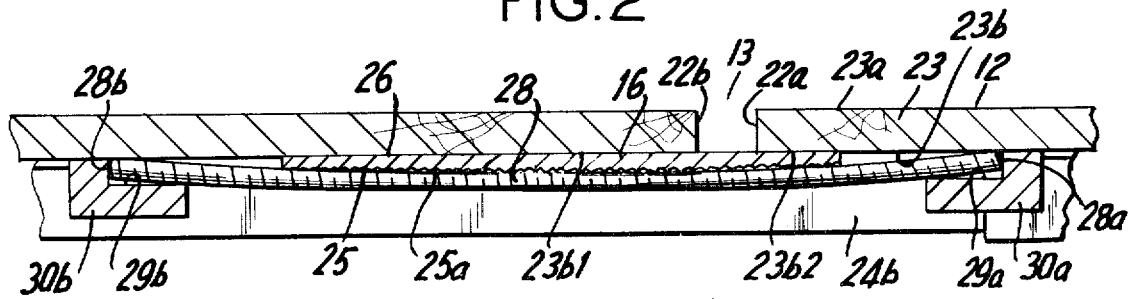
FIG. 3 is an enlarged sectional view taken along line 3—3 of FIG. 2.

Referring now to FIGS. 1, 2 and 3, there is shown one embodiment of the invention generally designated as 10, which comprises a rotary power saw 11, a table 12 having an opening 13 through which the powered saw blade 14 of power saw 11 extends upwardly; and a table mounting for inverted mounting of the saw, which mounting is generally designated as 15.

Power saw 11 is of a conventional design and comprises a base 16, a motor 17 mounted on the base 16, a saw blade housing 18 having a saw blade as aforesaid, a hand grip switch 19 and a power supply cable 20. In this particular embodiment, saw blade 14 passes through spacing 21 in base 16 and then in a mounted position passes upwardly through opening 13 between edges 22a and 22b of parted table 12. The rotary power saw 11 is fixedly held in this position by mounting 15 which will be described in further detail hereinafter. Table 12 is of a conventional design and is common with dining room or dinette tables. Table 12 comprises a table top 23, having a topside 23a and an underside 23b, four conventional legs 24 (typical) and a set of parallel extendable sliding brackets 24a (fragmented view FIG. 1) and 24b. As brackets 24a and 24b are coincidentally extended, table top opening 13 increases. This opening 13 need only be sufficiently wide to accomodate the work member, e.g. saw blade, with adequate clearance. Base 16 of power saw 11, has a top 25 and a bottom 26, the bottom being upwardly disposed because of the inverted mounting, which bottom 26 straddles opening 13 and is in pressing contact with underside portions 23b1 and 23b2 of respected parted portions of the table top 23.

Mounting 15 comprises a pair of spaced, about parallel threaded rods 27 and 28. The top 25 of base 16 is provided with a roughened groove surface 25a, by means of a rasp or file. The intimate contact of the threads of rods 27 and 28 with roughened groove surface 25a provides considerable frictional contact to further ensure the non-movement of the saw in actual use. The respective opposite ends of the rods 27 and 28 are held within the grooves of mounting blocks, as in FIG. 3 wherein ends 28a and 28b of rod 28 are secured within grooves 29a and 29b respectively of mounting blocks 30a and 30b respectively. The ends 28a and 28b of rod 28 are held under stress in an upwardly biasing mode so that a slight curvature of the rod is the result. This stressing of the rod further ensures secure holding of the power saw to the table. Rod 27 is mounted within blocks 31a and 31b in a manner similar to that of rod 28.

Figure 4:
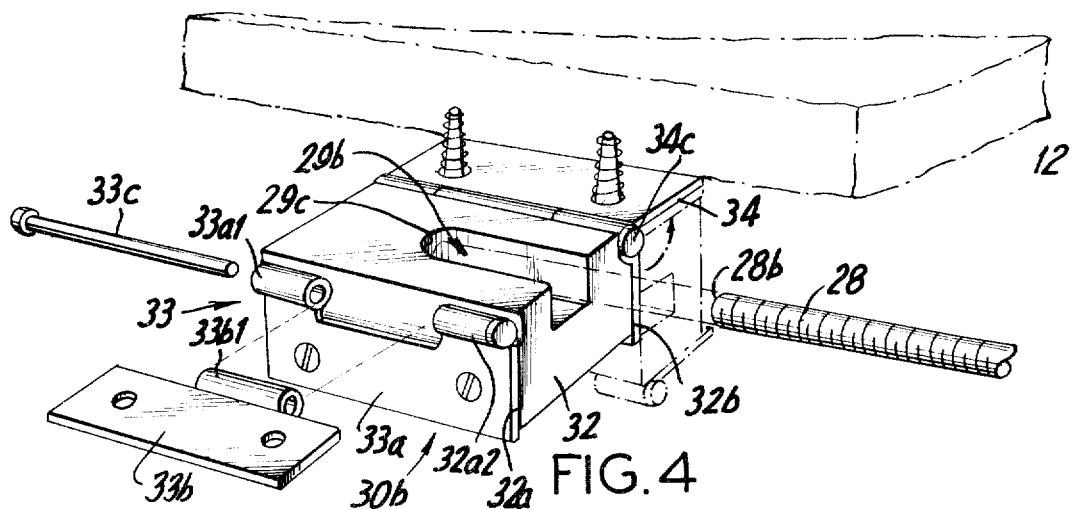
FIG. 4 is an enlarged perspective view of a mounting block in detail.

Referring now to FIG. 4, there is shown one mounting block 30b receiving end 28b of rod 28 in groove 29b. In receiving end 28b, it is preferred that the blocks be so spaced that end 28b contacts end wall 29c of groove 29b. Mounting block 30b comprises a body member 32 with groove 29b. One flange each of a pair of rotatable hinges 33 and 34 is screw-mounted to opposite ends of body member 32. Rotatable hinge 33 comprises a first flange 33a screw-mounted to one end 32a of body member 32, a second flange 33b having holes for screw-mounting of said second flange to the underside 23b of table top 23, and a pin 33c slidably engageable with cylindrical mounts 33a1 and 33a2 of first flange 33a and cylindrical mount 33b1 of second flange 33b when the hinge is assembled, as such. Rotatable hinge 34 is screw-mounted to end 32b and to the underside of the table in a manner similar to that of hinge 33.

By this manner of rotatable hinge construction, once mounting block 30b is aligned and screw-mounted to the underside of the table, the rod 28 may then be readily assembled to and disassembled from the mounting block 30b. By removing one pin 33c (as shown), mounting block 30b may then be rotated (see arrow FIG. 4) about pin 34c so as to provide clearance for receiving end 28b of rod 28, without the need for unscrewing mounting block 30b from the table. Once rod end 28b is brought forward, mounting block 30b is again rotated in the reverse direction thereby engaging end 28b in groove 29b, and upon pressing the block upwardly under some stress toward the underside of the table, cylindrical mounts 33a1, 33b1 and 33a2 are brought into coaxial alignment for receiving pin 33c. Rod end 28b is thusly received. It is of course understood that by this manner of operation, the other end 28a of rod 28 may be secured within mounting block 30a, and the opposite ends of rod 27 may be secured within mounting blocks 31a and 31b, respectively. Once the rod ends are secured as aforesaid, the rods 27 and 28 securely hold the power saw 11 to the underside of table 12, and the assembled unit is ready for work to be performed on the topside of the table.

Figure 5:
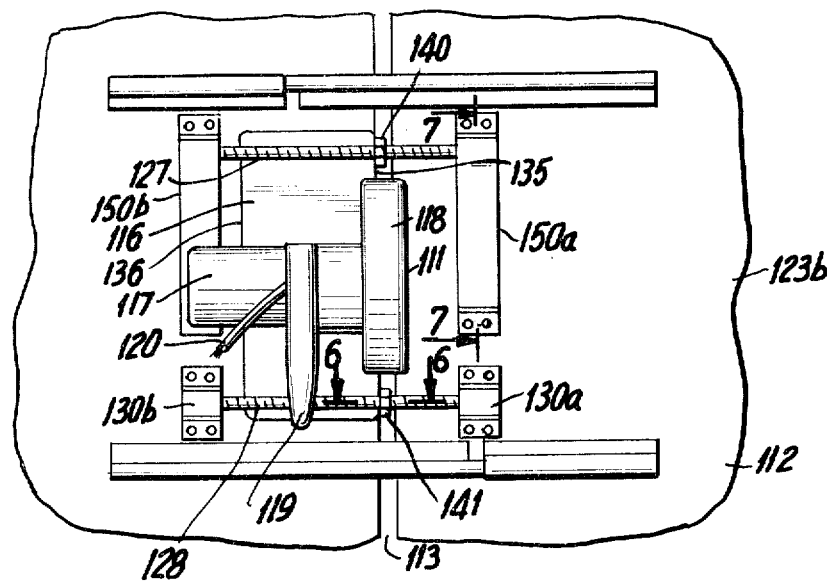
FIG. 5 is a bottom plan view of other embodiments of this invention.
Figure 6:
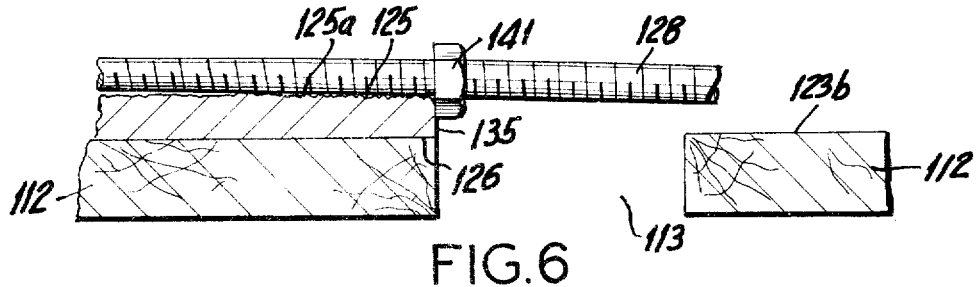
FIG. 6 is an enlarged fragmentary sectional view taken along line 6—6 of FIG. 5.
Figure 7:
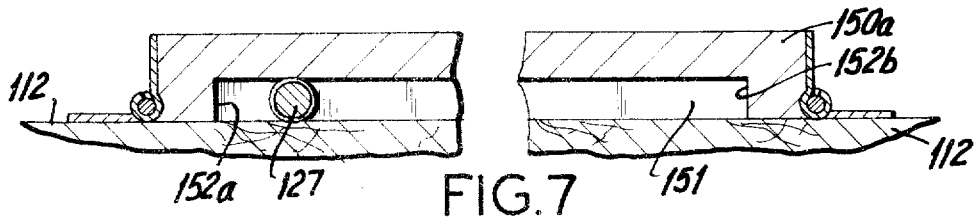
FIG. 7 is an enlarged fragmentary sectional view taken along line 7—7 of FIG. 5.

In FIGS. 5, 6 and 7 there is shown a power saw 111, mounted to the underside 123b of table 112. Table 112 is similar to table 12. The saw mounting, of FIGS. 5-7 is similar to that of the embodiment of FIGS. 1-4, with certain other features as further described hereinbelow.

Power saw 111 comprises a motor 117, a base 116 having a top 125 and a bottom 126, opposed sides 135 and 136, blade housing 118, a saw blade (not shown) housed therein, a hand grip switch 119, and a power supply cable 120. The saw blade is cantilevered away from the base 116 of base and passes upwardly passed the base side 135 and through the opening 113 in the table. Therefore the underside 126 of base 116 resides wholly against one underside part of the parted table. To ensure that the blade remains therein place threaded nuts 140 and 141 are engaged on rods 127 and 128, respectively and threaded so as to abut side 135 of base 116.

By this manner of construction power tools having cantilevered work members may also be utilized in the invention.

Mounting blocks 130a and 130b secure rod 128 against the roughened groove surface 125a of base top 125, in a manner similar to that of mounting blocks FIGS. 1-4. Mounting blocks 150a and 150b are identical one to the other, but differ from those mounting blocks as heretofore described in that the blocks 150a and 150b are elongated and the grooves therein are likewise elongated. Referring specifically to FIG. 7, rod 127 is held securely within groove 151 and spaced from groove walls 152a and 152b. Rod 127 may be secured at any one of a number of points along the length of the groove 151 between walls 152a and 152b. In this manner of mounting of FIGS. 5-7, the spacing between rods 127 and 128 is adjustable so as to accomodate several different bases of varying lengths for different power tools, without disassembling the mounting block from the table.

To assemble the mounting of this invention, first the table is opened to the desired opening to accomodate the work member of the power tool and to clear the tool member housing guard. The base of the power tool is then placed on the underside portions or portion of the inverted table and rods lifted onto the roughened grooves on top of the base and spaced from each other the desired degree; adjusting the distance between sets of blocks accordingly. The rod ends should bottom out in the groove. With the blocks so aligned, the underside of the table is marked so as to provide for drilling holes to receive the screws of the hinge flanges joined to the table. Once the mounting blocks are so joined to the table, they need not be disjoined, to remove the power tool, as previously described.

It has been found that the bases of most portable power tools are about one eighth inch in thickness, and that by providing a roughened groove of about 1/32 inch, threaded rods of about 5/16 inch may be securely received within mounting blocks have depths of about 5/16 inch. Metal construction of the mounting blocks and rods is preferred.

It has also been found for best results that at least one of the rods by perpendicularly disposed to the one pair of mounting blocks, but that both rods need not be so perpendicularly disposed nor need the rods be in parallel disposition to each other.

While the aforedescribed embodiment describes the invention in terms of a rotary power saw, other power tools may be employed pursuant to this invention as by way of example, grinding wheels, buffers, sanding discs and wheels; and the like. Therefore it can be seen that the invention is broadly useful to convert a household table and portable power tools to a work bench unit.

It is to be understood that modifications may be made to my invention and that this invention is not limited to the particular embodiments described hereinabove, but that the invention is to cover all mofidications within the scope of the appended claims.

What I claim is:

1. A table mounting for a power tool comprising means to hold the base of the power tool against the underside of a table having an opening in the top thereof, and means to join said holding means to said table, and wherein said holding means comprises rod means transversely disposed to the top of the base and means to frictionally engage said rod means to the top of the base so that the bottom of the base is frictionally held to the underside of the table top, wherein said rod means extends transversely across the top of the base and transversely across the opening in the table, and wherein the means to frictionally engage the rod means to the top of the base comprises means to hold the ends of the rod means in an upwardly biasing stress mode, whereby the power tool work member extends upwardly through the opening in the table and is held therein place.

2. The mounting of claim 1, wherein said rod means comprises a pair of spaced rods.

3. The mounting of claim 2, wherein said rods are in about parallel disposition.

4. The mounting of claim 2, wherein said means to hold the ends of the rods in an upwardly biasing stress mode comprises two pair of blocks, one pair thereof for the ends of each rod, said blocks each having an upwardly facing groove to receive one end each of the rod, said blocks being joined to the table.

5. The mounting of claim 4, wherein said means to join said holding means to said table comprises a pair of angle brackets for each as said blocks, one flange of each of said angle brackets being connected to opposed ends of each block and the other flange of each of said angle brackets being connected to the underside of the table top.

6. The mounting of claim 5, wherein each angle bracket comprises a rotatable hinge.

7. The mounting of claim 6, wherein each rotatable hinge comprises a removable hinge pin so that with one pin removed, a block may be rotated away from the underside of the table so as to free the rod end without having to disconnect the flange from the underside of the table top.

8. The mounting of claim 2, wherein the rod is ridged.

9. The mounting of claim 2, wherein the rod is threaded.

10. The mounting of claim 9, wherein the top of the base is provided with a pair of grooves, one each of said grooves to receive one of said rods.

11. The mounting of claim 4, wherein each block of one pair of opposed blocks has an elongated groove, the opposed grooves being in about parallel disposition.

12. The mounting of claim 4, wherein the depth of each groove is about equal to the thickness of the rod received therein.

13. The mounting of claim 4, wherein the ends of each of the rods contacting engages the back wall of its respective block groove.

* * * * *